United States Patent
Whitesides et al.

(10) Patent No.: US 7,327,511 B2
(45) Date of Patent: Feb. 5, 2008

(54) LIGHT MODULATORS

(75) Inventors: Thomas H. Whitesides, Somerville, MA (US); Michael M. McCreary, Acton, MA (US); Richard J. Paolini, Jr., Arlington, MA (US)

(73) Assignee: E Ink Corporation, Cambridge, MA (US)

( * ) Notice: Subject to any disclaimer, the term of this patent is extended or adjusted under 35 U.S.C. 154(b) by 0 days.

(21) Appl. No.: 10/907,140

(22) Filed: Mar. 22, 2005

(65) Prior Publication Data

US 2005/0213191 A1 Sep. 29, 2005

Related U.S. Application Data

(60) Provisional application No. 60/585,879, filed on Jul. 7, 2004, provisional application No. 60/555,529, filed on Mar. 23, 2004.

(51) Int. Cl.
*G02B 26/00* (2006.01)
*G09G 3/34* (2006.01)

(52) U.S. Cl. .......................... 359/296; 430/32; 430/34; 345/84; 345/107

(58) Field of Classification Search .............. 359/296; 430/32, 34, 38; 345/84, 107
See application file for complete search history.

(56) References Cited

U.S. PATENT DOCUMENTS

| | | | |
|---|---|---|---|
| 2,932,629 A | 4/1960 | Wiley et al. | |
| 2,934,530 A | 4/1960 | Ballast et al. | |
| 3,668,106 A | 6/1972 | Ota | |
| 3,756,693 A | 9/1973 | Ota | |
| 3,767,392 A | 10/1973 | Ota | |
| 3,792,308 A | 2/1974 | Ota | |
| 3,870,517 A | 3/1975 | Ota et al. | |
| 3,892,568 A | 7/1975 | Ota | |
| 4,418,346 A | 11/1983 | Batchelder | |
| 4,435,047 A | 3/1984 | Fergason | |
| 4,605,284 A | 8/1986 | Fergason | |

(Continued)

FOREIGN PATENT DOCUMENTS

EP 0 443 571 A2 8/1991

(Continued)

OTHER PUBLICATIONS

Amundson, K., "Electrophoretic Imaging Films for Electronic Paper Displays" in Crawford, G. ed. Flexible Flat Panel Displays, John Wiley & Sons, Ltd., Hoboken, NJ: 2005.

(Continued)

*Primary Examiner*—Evelyn A. Lester
(74) *Attorney, Agent, or Firm*—David J. Cole

(57) ABSTRACT

Various improvements in electrophoretic media and displays intended for use in light modulators are described. These improvements include index matching of the suspending fluid to a continuous phase surrounding the fluid, index matching of a capsule wall to a binder, planarization of a layer containing electrophoretic capsules before application of adhesive thereto, methods for concentrating electrophoretic particles into limited areas of sidewalls of electrophoretic capsules or microcells in the light-transmissive state of the display, and, in the case of light modulators comprising an electrophoretic layer sandwiched between two transparent plates, forming at least one of the plates so as to absorb electromagnetic radiation which adversely affects the electrophoretic layer.

7 Claims, 1 Drawing Sheet

U.S. PATENT DOCUMENTS

| | | |
|---|---|---|
| 4,616,903 A | 10/1986 | Fergason |
| 4,643,528 A | 2/1987 | Bell, Jr. |
| 4,707,080 A | 11/1987 | Fergason |
| 4,833,060 A | 5/1989 | Nair et al. |
| 4,835,084 A | 5/1989 | Nair et al. |
| 4,919,521 A | 4/1990 | Tada et al. |
| 4,965,131 A | 10/1990 | Nair et al. |
| 4,994,312 A | 2/1991 | Maier et al. |
| 5,055,371 A | 10/1991 | Lee et al. |
| 5,138,472 A | 8/1992 | Jones et al. |
| 5,216,530 A | 6/1993 | Pearlman et al. |
| 5,270,843 A | 12/1993 | Wang |
| 5,351,143 A | 9/1994 | Sato et al. |
| 5,354,799 A | 10/1994 | Bennett et al. |
| 5,411,398 A | 5/1995 | Nakanishi et al. |
| 5,463,491 A | 10/1995 | Check, III |
| 5,463,492 A | 10/1995 | Check, III |
| 5,530,567 A | 6/1996 | Takei |
| 5,580,692 A | 12/1996 | Lofftus et al. |
| 5,594,562 A | 1/1997 | Sato et al. |
| 5,650,872 A | 7/1997 | Saxe et al. |
| 5,700,608 A | 12/1997 | Eshelman et al. |
| 5,745,094 A | 4/1998 | Gordon, II et al. |
| 5,760,761 A | 6/1998 | Sheridon |
| 5,777,782 A | 7/1998 | Sheridon |
| 5,798,315 A | 8/1998 | Etoh et al. |
| 5,808,783 A | 9/1998 | Crowley |
| 5,872,552 A | 2/1999 | Gordon, II et al. |
| 5,930,026 A | 7/1999 | Jacobson et al. |
| 5,961,804 A | 10/1999 | Jacobson et al. |
| 6,017,584 A | 1/2000 | Albert et al. |
| 6,025,896 A | 2/2000 | Hattori et al. |
| 6,054,071 A | 4/2000 | Mikkelsen, Jr. |
| 6,055,091 A | 4/2000 | Sheridon et al. |
| 6,067,185 A | 5/2000 | Albert et al. |
| 6,097,531 A | 8/2000 | Sheridon |
| 6,113,810 A | 9/2000 | Hou et al. |
| 6,118,426 A | 9/2000 | Albert et al. |
| 6,120,588 A | 9/2000 | Jacobson |
| 6,120,839 A | 9/2000 | Comiskey et al. |
| 6,124,851 A | 9/2000 | Jacobson |
| 6,128,124 A | 10/2000 | Silverman |
| 6,130,773 A | 10/2000 | Jacobson et al. |
| 6,130,774 A | 10/2000 | Albert et al. |
| 6,137,467 A | 10/2000 | Sheridon et al. |
| 6,144,361 A | 11/2000 | Gordon, II et al. |
| 6,147,791 A | 11/2000 | Sheridon |
| 6,156,473 A | 12/2000 | Tyagi et al. |
| 6,172,798 B1 | 1/2001 | Albert et al. |
| 6,177,921 B1 | 1/2001 | Comiskey et al. |
| 6,184,856 B1 | 2/2001 | Gordon, II et al. |
| 6,215,540 B1 | 4/2001 | Stephenson |
| 6,215,920 B1 | 4/2001 | Whitehead et al. |
| 6,225,971 B1 | 5/2001 | Gordon, II et al. |
| 6,232,950 B1 | 5/2001 | Albert et al. |
| 6,241,921 B1 | 6/2001 | Jacobson et al. |
| 6,249,271 B1 | 6/2001 | Albert et al. |
| 6,252,564 B1 | 6/2001 | Albert et al. |
| 6,262,706 B1 * | 7/2001 | Albert et al. .............. 345/107 |
| 6,262,833 B1 | 7/2001 | Loxley et al. |
| 6,271,823 B1 | 8/2001 | Gordon, II et al. |
| 6,300,932 B1 | 10/2001 | Albert |
| 6,301,038 B1 | 10/2001 | Fitzmaurice et al. |
| 6,312,304 B1 | 11/2001 | Duthaler et al. |
| 6,312,971 B1 | 11/2001 | Amundson et al. |
| 6,323,989 B1 | 11/2001 | Jacobson et al. |
| 6,327,072 B1 | 12/2001 | Comiskey et al. |
| 6,376,828 B1 | 4/2002 | Comiskey |
| 6,377,383 B1 | 4/2002 | Whitehead et al. |
| 6,377,387 B1 | 4/2002 | Duthaler et al. |
| 6,392,785 B1 | 5/2002 | Albert et al. |
| 6,392,786 B1 | 5/2002 | Albert |
| 6,413,790 B1 | 7/2002 | Duthaler et al. |
| 6,422,687 B1 | 7/2002 | Jacobson |
| 6,445,374 B2 | 9/2002 | Albert et al. |
| 6,445,489 B1 | 9/2002 | Jacobson et al. |
| 6,459,418 B1 | 10/2002 | Comiskey et al. |
| 6,473,072 B1 | 10/2002 | Comiskey et al. |
| 6,480,182 B2 | 11/2002 | Turner et al. |
| 6,498,114 B1 | 12/2002 | Amundson et al. |
| 6,498,674 B1 | 12/2002 | Sheridon |
| 6,504,524 B1 | 1/2003 | Gates et al. |
| 6,506,438 B2 | 1/2003 | Duthaler et al. |
| 6,512,354 B2 | 1/2003 | Jacobson et al. |
| 6,515,649 B1 | 2/2003 | Albert et al. |
| 6,518,949 B2 | 2/2003 | Drzaic |
| 6,531,997 B1 | 3/2003 | Gates et al. |
| 6,535,197 B1 | 3/2003 | Comiskey et al. |
| 6,538,801 B2 | 3/2003 | Jacobson et al. |
| 6,545,291 B1 | 4/2003 | Amundson et al. |
| 6,580,545 B2 | 6/2003 | Morrison et al. |
| 6,639,578 B1 | 10/2003 | Comiskey et al. |
| 6,657,772 B2 | 12/2003 | Loxley |
| 6,664,944 B1 | 12/2003 | Albert et al. |
| 6,672,921 B1 | 1/2004 | Liang et al. |
| 6,680,725 B1 | 1/2004 | Jacobson |
| 6,683,333 B2 | 1/2004 | Kazlas et al. |
| 6,693,620 B1 | 2/2004 | Herb et al. |
| 6,704,133 B2 | 3/2004 | Gates et al. |
| 6,710,540 B1 | 3/2004 | Albert et al. |
| 6,721,083 B2 | 4/2004 | Jacobson et al. |
| 6,724,519 B1 | 4/2004 | Comiskey et al. |
| 6,727,881 B1 | 4/2004 | Albert et al. |
| 6,750,473 B2 | 6/2004 | Amundson et al. |
| 6,753,999 B2 | 6/2004 | Zehner et al. |
| 6,788,449 B2 | 9/2004 | Liang et al. |
| 6,816,147 B2 | 11/2004 | Albert |
| 6,822,782 B2 | 11/2004 | Honeyman et al. |
| 6,825,068 B2 | 11/2004 | Denis et al. |
| 6,825,829 B1 | 11/2004 | Albert et al. |
| 6,831,769 B2 | 12/2004 | Holman et al. |
| 6,839,158 B2 | 1/2005 | Albert et al. |
| 6,842,279 B2 | 1/2005 | Amundson |
| 6,842,657 B1 | 1/2005 | Drzaic et al. |
| 6,864,875 B2 | 3/2005 | Drzaic et al. |
| 6,865,010 B2 | 3/2005 | Duthaler et al. |
| 6,866,760 B2 | 3/2005 | Paolini Jr. et al. |
| 6,870,661 B2 | 3/2005 | Pullen et al. |
| 6,922,276 B2 | 7/2005 | Zhang et al. |
| 6,950,220 B2 | 9/2005 | Abramson et al. |
| 6,958,848 B2 | 10/2005 | Cao et al. |
| 6,982,178 B2 | 1/2006 | LeCain et al. |
| 6,987,603 B2 | 1/2006 | Paolini, Jr. et al. |
| 6,995,550 B2 | 2/2006 | Jacobson et al. |
| 7,002,728 B2 | 2/2006 | Pullen et al. |
| 7,012,735 B2 | 3/2006 | Honeyman et al. |
| 2002/0060321 A1 | 5/2002 | Kazlas et al. |
| 2002/0063661 A1 | 5/2002 | Comiskey et al. |
| 2002/0090980 A1 | 7/2002 | Wilcox et al. |
| 2002/0113770 A1 | 8/2002 | Jacobson et al. |
| 2002/0130832 A1 | 9/2002 | Baucom et al. |
| 2002/0180687 A1 | 12/2002 | Webber |
| 2003/0011560 A1 | 1/2003 | Albert et al. |
| 2003/0020844 A1 | 1/2003 | Albert et al. |
| 2003/0030884 A1 * | 2/2003 | Minami .................... 359/296 |
| 2003/0102858 A1 | 6/2003 | Jacobson et al. |
| 2003/0132908 A1 | 7/2003 | Herb et al. |
| 2003/0137521 A1 | 7/2003 | Zehner et al. |
| 2003/0151702 A1 | 8/2003 | Morrison et al. |
| 2003/0214695 A1 | 11/2003 | Abramson et al. |
| 2003/0222315 A1 | 12/2003 | Amundson et al. |
| 2004/0012839 A1 | 1/2004 | Cao et al. |
| 2004/0014265 A1 | 1/2004 | Kazlas et al. |
| 2004/0075634 A1 | 4/2004 | Gates |

| | | | |
|---|---|---|---|
| 2004/0094422 A1 | 5/2004 | Pullen et al. | |
| 2004/0105036 A1 | 6/2004 | Danner et al. | |
| 2004/0112750 A1 | 6/2004 | Jacobson et al. | |
| 2004/0119681 A1 | 6/2004 | Albert et al. | |
| 2004/0136048 A1 | 7/2004 | Arango et al. | |
| 2004/0155857 A1 | 8/2004 | Duthaler et al. | |
| 2004/0180476 A1 | 9/2004 | Kazlas et al. | |
| 2004/0190114 A1 | 9/2004 | Jacobson et al. | |
| 2004/0196215 A1 | 10/2004 | Duthaler et al. | |
| 2004/0226820 A1 | 11/2004 | Webber et al. | |
| 2004/0233509 A1 | 11/2004 | Zhang et al. | |
| 2004/0239614 A1 | 12/2004 | Amundson et al. | |
| 2004/0252360 A1 | 12/2004 | Webber et al. | |
| 2004/0257635 A1 | 12/2004 | Paolini, Jr. et al. | |
| 2004/0263947 A1 | 12/2004 | Drzaic et al. | |
| 2005/0001810 A1 | 1/2005 | Yakushiji et al. | |
| 2005/0001812 A1 | 1/2005 | Amundson et al. | |
| 2005/0007336 A1 | 1/2005 | Albert et al. | |
| 2005/0007653 A1 | 1/2005 | Honeyman et al. | |
| 2005/0012980 A1 | 1/2005 | Wilcox et al. | |
| 2005/0017944 A1 | 1/2005 | Albert | |
| 2005/0018273 A1 | 1/2005 | Honeyman et al. | |
| 2005/0024353 A1 | 2/2005 | Amundson et al. | |
| 2005/0035941 A1 | 2/2005 | Albert et al. | |
| 2005/0041004 A1 | 2/2005 | Gates et al. | |
| 2005/0062714 A1 | 3/2005 | Zehner et al. | |
| 2005/0067656 A1 | 3/2005 | Denis et al. | |
| 2005/0078099 A1 | 4/2005 | Amundson et al. | |
| 2005/0105159 A1 | 5/2005 | Paolini, Jr. et al. | |
| 2005/0105162 A1 | 5/2005 | Paolini, Jr. et al. | |
| 2005/0122284 A1 | 6/2005 | Gates et al. | |
| 2005/0122306 A1 | 6/2005 | Wilcox et al. | |
| 2005/0122563 A1 | 6/2005 | Honeyman et al. | |
| 2005/0122564 A1 | 6/2005 | Zehner et al. | |
| 2005/0122565 A1 | 6/2005 | Doshi et al. | |
| 2005/0134554 A1 | 6/2005 | Albert et al. | |
| 2005/0146774 A1 | 7/2005 | LeCain et al. | |
| 2005/0151709 A1 | 7/2005 | Jacobson et al. | |
| 2005/0152022 A1 | 7/2005 | Honeyman et al. | |
| 2005/0156340 A1 | 7/2005 | Valianatos et al. | |
| 2005/0168799 A1 | 8/2005 | Whitesides et al. | |
| 2005/0168801 A1 | 8/2005 | O'Neil et al. | |
| 2005/0179642 A1 | 8/2005 | Wilcox et al. | |
| 2005/0190137 A1 | 9/2005 | Duthaler et al. | |
| 2005/0212747 A1 | 9/2005 | Amundson | |
| 2005/0270261 A1 | 12/2005 | Danner et al. | |

FOREIGN PATENT DOCUMENTS

| | | |
|---|---|---|
| EP | 0 659 866 A2 | 6/1995 |
| EP | 1 115 026 A2 | 7/2001 |
| EP | 1 099 207 B1 | 3/2002 |
| EP | 1 145 072 B1 | 5/2003 |
| EP | 1 462 847 | 9/2004 |
| EP | 1 482 354 | 12/2004 |
| EP | 1 484 635 | 12/2004 |
| EP | 1 500 971 A1 | 1/2005 |
| EP | 1 501 194 A1 | 1/2005 |
| EP | 1 536 271 | 6/2005 |
| EP | 1 542 067 | 6/2005 |
| EP | 1 577 702 | 9/2005 |
| EP | 1 577 703 | 9/2005 |
| EP | 1 598 694 | 11/2005 |
| WO | WO 00/05704 | 2/2000 |
| WO | WO 00/36560 | 6/2000 |
| WO | WO 00/38000 | 6/2000 |
| WO | WO 00/67110 | 11/2000 |
| WO | WO 00/67327 | 11/2000 |
| WO | WO 01/07961 | 2/2001 |
| WO | WO 01/27690 | 4/2001 |
| WO | WO 03/107315 | 12/2003 |
| WO | WO 2004/001498 | 12/2003 |
| WO | WO 2004/079442 | 9/2004 |
| WO | WO 2004/090626 | 10/2004 |

OTHER PUBLICATIONS

Amundson, K., et al., "Flexible, Active-Matrix Display Constructed Using a Microencapsulated Electrophoretic Material and an Organic-Semiconductor-Based Backplane", SID 01 Digest, 160 (Jun. 2001).

Au, J. et al., "Ultra-Thin 3.1-in. Active-Matrix Electronic Ink Display for Mobile Devices", IDW'02, 223 (2002).

Bach, U., et al., "Nanomaterials-Based Electrochromics for Paper-Quality Displays", Adv. Mater, 14(11), 845 (2002).

Bampfield, H.A., and Cooper, J., "Emulsion Explosives", in "Encyclopedia of Emulsion Technology: vol. 3—Basic Theory Measurement Applications", Becher, P. (ed.), Marcel Dekker, New York (1988).

Bouchard, A. et al., "High-Resolution Microencapsulated Electrophoretic Display on Silicon", SID 04 Digest, 651 (2004).

Caillot, E. et al. "Active Matrix Electrophoretic Information Display for High Performance Mobile Devices", IDMC Proceedings (2003).

Cameron, N.R., et al., "High Internal Phase Emulsions (HIPEs)—Structure, Properties and Use in Polymer Preparation", Adv. Polym. Sci., 126, 163 (1996).

Chen, Y., et al., "A Conformable Electronic Ink Display using a Foil-Based a-Si TFT Array", SID 01 Digest, 157 (Jun. 2001).

Comiskey, B., et al., "An electrophoretic ink for all-printed reflective electronic displays", Nature, 394, 253 (1998).

Comiskey, B., et al., "Electrophoretic Ink: A Printable Display Material", SID 97 Digest (1997), p. 75.

Danner, G.M. et al., "Reliability Performance for Microencapsulated Electrophoretic Displays with Simulated Active Matrix Drive", SID 03 Digest, 573 (2003).

Drzaic, P., et al., "A Printed and Rollable Bistable Electronic Display", SID 98 Digest (1998), p. 1131.

Duthaler, G., et al., "Active-Matrix Color Displays Using Electrophoretic Ink and Color Filters", SID 02 Digest, 1374 (2002).

Gates, H. et al., "A5 Sized Electronic Paper Display for Document Viewing", SID 05 Digest, (2005).

Henzen, A. et al., "An Electronic Ink Low Latency Drawing Tablet", SID 04 Digest, 1070 (2004).

Henzen, A. et al., "Development of Active Matrix Electronic Ink Displays for Handheld Devices", SID 03 Digest, 176, (2003).

Henzen, A. et al., "Development of Active Matrix Electronic Ink Displays for Smart Handheld Applications", IDW'02, 227 (2002).

Jacobson, J., et al., "The last book", IBM Systems J., 36, 457 (1997).

Ji, Y., et al., "P-50: Polymer Walls in Higher-Polymer-Content Bistable Reflective Cholesteric Displays", SID 96 Digest, 611 (1996).

Jo, G-R, et al., "Toner Display Based on Particle Movements", Chem. Mater, 14, 664 (2002).

Johnson, M. et al., "High Quality Images on Electronic Paper Displays", SID 05 Digest, 1666 (2005).

Kazlas, P. et al., "Card-size Active-matrix Electronic Ink Display", Eurodisplay 2002, 259 (2002).

Kazlas, P., et al., "12.1" SVGA Microencapsulated Electrophoretic Active Matrix Display for Information Applicances", SID 01 Digest, 152 (Jun. 2001).

Kitamura, T., et al., "Electrical toner movement for electronic paper-like display", Asia Display/IDW '01, p. 1517, Paper HCS1-1 (2001).

O'Regan, B. et al., "A Low Cost, High-efficiency Solar Cell Based on Dye-sensitized colloidal $TiO_2$ Films", Nature, vol. 353, Oct. 24, 1991, 773-740.

Pitt, M.G., et al., "Power Consumption of Microencapsulated Electrophoretic Displays for Smart Handheld Applications", SID 02 Digest, 1378 (2002).

Webber, R., "Image Stability in Active-Matrix Microencapsulated Electrophoretic Displays", SID 02 Digest, 126 (2002).

Whitesides, T. et al., "Towards Video-rate Microencapsulated Dual-Particle Electrophoretic Displays", SID 04 Digest, 133 (2004).

Wood, D., "An Electrochromic Renaissance?" Information Display, 18(3), 24 (Mar. 2002).

Yamaguchi, Y., et al., "Toner display using insulative particles charged triboelectrically", Asia Display/IDW '01, p. 1729, Paper AMD4-4 (2001).

Zehner, R. et al., "Drive Waveforms for Active Matrix Electrophoretic Displays", SID 03 Digest, 842 (2003).

* cited by examiner

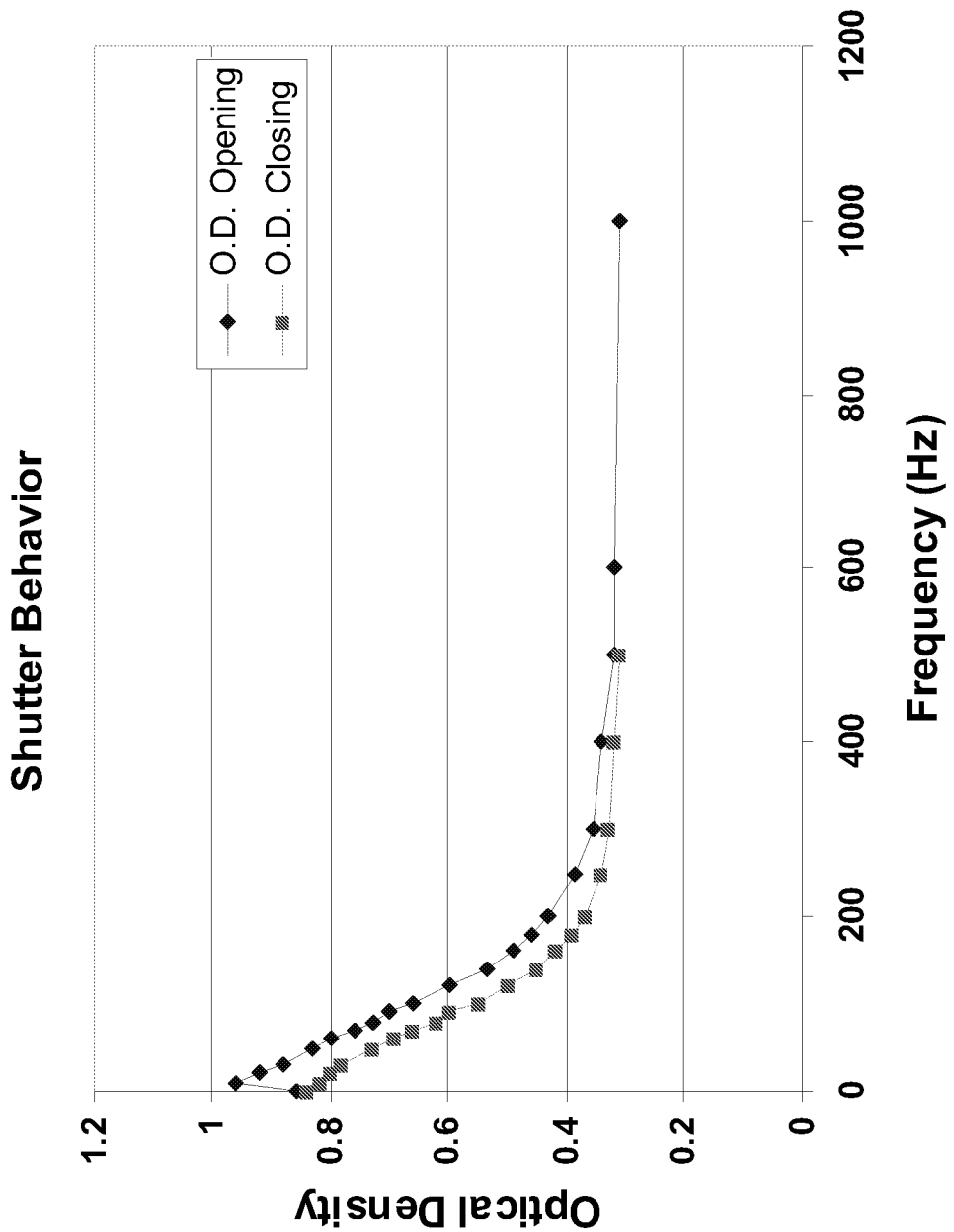

LIGHT MODULATORS

REFERENCE TO RELATED APPLICATIONS

This application claims benefit of copending provisional Application Ser. No. 60/555,529, filed Mar. 23, 2004, and of copending provisional Application Ser. No. 60/585,879, filed Jul. 7, 2004.

This application is also related to copending application Ser. No. 10/687,166, filed Oct. 16, 2003 (Publication No. 2004/0136048).

The entire contents of these copending applications, and of all other U.S. patents and published and copending applications mentioned below, are herein incorporated by reference.

BACKGROUND OF THE INVENTION

This invention relates to light modulators, that is to say to variable transmission windows, mirrors and similar devices designed to modulate the amount of light or other electromagnetic radiation passing therethrough; for convenience, the term "light" will normally be used herein, but this term should be understood in a broad sense to include electromagnetic radiation at non-visible wavelengths. For example, as mentioned below, the present invention may be applied to provide windows which can modulate infra-red radiation for controlling temperatures within buildings. More specifically, this invention relates to light modulators which use particle-based electrophoretic media to control light modulation.

Particle-based electrophoretic displays, in which a plurality of charged particles move through a suspending fluid under the influence of an electric field, have been the subject of intense research and development for a number of years. Such displays can have attributes of good brightness and contrast, wide viewing angles, state bistability, and low power consumption when compared with liquid crystal displays.

The terms "bistable" and "bistability" are used herein in their conventional meaning in the art to refer to displays comprising display elements having first and second display states differing in at least one optical property, and such that after any given element has been driven, by means of an addressing pulse of finite duration, to assume either its first or second display state, after the addressing pulse has terminated, that state will persist for at least several times, for example at least four times, the minimum duration of the addressing pulse required to change the state of the display element. It is shown in published U.S. patent application Ser. No. 2002/0180687 that some particle-based electrophoretic displays capable of gray scale are stable not only in their extreme black and white states but also in their intermediate gray states, and the same is true of some other types of electro-optic displays. This type of display is properly called "multi-stable" rather than bistable, although for convenience the term "bistable" may be used herein to cover both bistable and multi-stable displays.

Nevertheless, problems with the long-term image quality of these displays have prevented their widespread usage. For example, particles that make up electrophoretic displays tend to settle, resulting in inadequate service-life for these displays.

As noted above, electrophoretic media require the presence of a suspending fluid. In most prior art electrophoretic media, this suspending fluid is a liquid, but electrophoretic media can be produced using gaseous suspending fluids; see, for example, Kitamura, T., et al., "Electrical toner movement for electronic paper-like display", IDW Japan, 2001, Paper HCS1-1, and Yamaguchi, Y, et al., "Toner display using insulative particles charged triboelectrically", IDW Japan, 2001, Paper AMD4-4). See also European Patent Applications 1,429,178; 1,462,847; and 1,482,354; and International Applications WO 2004/090626; WO 2004/079442; WO 2004/077140; WO 2004/059379; WO 2004/055586; WO 2004/008239; WO 2004/006006; WO 2004/001498; WO 03/091799; and WO 03/088495. Such gas-based electrophoretic media appear to be susceptible to the same types of problems due to particle settling as liquid-based electrophoretic media, when the media are used in an orientation which permits such settling, for example in a sign where the medium is disposed in a vertical plane. Indeed, particle settling appears to be a more serious problem in gas-based electrophoretic media than in liquid-based ones, since the lower viscosity of gaseous suspending fluids as compared with liquid ones allows more rapid settling of the electrophoretic particles.

Numerous patents and applications assigned to or in the names of the Massachusetts Institute of Technology (MIT) and E Ink Corporation have recently been published describing encapsulated electrophoretic media. Such encapsulated media comprise numerous small capsules, each of which itself comprises an internal phase containing electrophoretically-mobile particles suspended in a liquid suspending medium, and a capsule wall surrounding the internal phase. Typically, the capsules are themselves held within a polymeric binder to form a coherent layer positioned between two electrodes. Encapsulated media of this type are described, for example, in U.S. Pat. Nos. 5,930,026; 5,961,804; 6,017,584; 6,067,185; 6,118,426; 6,120,588; 6,120,839; 6,124,851; 6,130,773; 6,130,774; 6,172,798; 6,177,921; 6,232,950; 6,249,271; 6,252,564; 6,262,706; 6,262,833; 6,300,932; 6,312,304; 6,312,971; 6,323,989; 6,327,072; 6,376,828; 6,377,387; 6,392,785; 6,392,786; 6,413,790; 6,422,687; 6,445,374; 6,445,489; 6,459,418; 6,473,072; 6,480,182; 6,498,114; 6,504,524; 6,506,438; 6,512,354; 6,515,649; 6,518,949; 6,521,489; 6,531,997; 6,535,197; 6,538,801; 6,545,291; 6,580,545; 6,639,578; 6,652,075; 6,657,772; 6,664,944; 6,680,725; 6,683,333; 6,704,133; 6,710,540; 6,721,083; 6,727,881; 6,738,050; 6,750,473; 6,753,999; 6,816,147; 6,819,471; 6,822,782; 6,825,068; 6,825,829; 6,825,970; 6,831,769; 6,839,158; 6,842,279; 6,842,657; and 6,842,167; and U.S. Patent Applications Publication Nos. 2002/0060321; 2002/0060321; 2002/0063661; 2002/0090980; 2002/0113770; 2002/0130832; 2002/0131147; 2002/0171910; 2002/0180687; 2002/0180688; 2003/0011560; 2003/0020844; 2003/0025855; 2003/0102858; 2003/0132908; 2003/0137521; 2003/0151702; 2003/0214695; 2003/0214697; 2003/0222315; 2004/0012839; 2004/0014265; 2004/0027327; 2004/0075634; 2004/0094422; 2004/0105036; 2004/0112750; 2004/0119681; and 2004/0196215; 2004/0226820; 2004/0233509; 2004/0239614; 2004/0252360; 2004/0257635; 2004/0263947; 2005/0000813; 2005/0001812; 2005/0007336; 2005/0007653; 2005/0012980; 2005/0017944; 2005/0018273; and 2005/0024353; and International Applications Publication Nos. WO 99/67678; WO 00/05704; WO 00/38000; WO 00/38001; WO 00/36560; WO 00/67110; WO 00/67327; WO 01/07961; WO 01/08241; WO 03/107, 315; WO 2004/023195; WO 2004/049045; WO 2004/059378; WO 2004/088002; WO 2004/088395; WO 2004/090857; and WO 2004/099862.

Known electrophoretic media, both encapsulated and unencapsulated, can be divided into two main types, referred to hereinafter for convenience as "single particle" and "dual particle" respectively. A single particle medium has only a single type of electrophoretic particle suspended in a suspending medium, at least one optical characteristic of which differs from that of the particles. (In referring to a single type of particle, we do not imply that all particles of the type are absolutely identical. For example, provided that all particles of the type possess substantially the same optical characteristic and a charge of the same polarity, considerable variation in parameters such as particle size and electrophoretic mobility can be tolerated without affecting the utility of the medium.) When such a medium is placed between a pair of electrodes, at least one of which is transparent, depending upon the relative potentials of the two electrodes, the medium can display the optical characteristic of the particles (when the particles are adjacent the electrode closer to the observer, hereinafter called the "front" electrode) or the optical characteristic of the suspending medium (when the particles are adjacent the electrode remote from the observer, hereinafter called the "rear" electrode (so that the particles are hidden by the suspending medium).

A dual particle medium has two different types of particles differing in at least one optical characteristic and a suspending fluid which may be uncolored or colored, but which is typically uncolored. The two types of particles differ in electrophoretic mobility; this difference in mobility may be in polarity (this type may hereinafter be referred to as an "opposite charge dual particle" medium) and/or magnitude. When such a dual particle medium is placed between the aforementioned pair of electrodes, depending upon the relative potentials of the two electrodes, the medium can display the optical characteristic of either set of particles, although the exact manner in which this is achieved differs depending upon whether the difference in mobility is in polarity or only in magnitude. For ease of illustration, consider an electrophoretic medium in which one type of particles is black and the other type white. If the two types of particles differ in polarity (if, for example, the black particles are positively charged and the white particles negatively charged), the particles will be attracted to the two different electrodes, so that if, for example, the front electrode is negative relative to the rear electrode, the black particles will be attracted to the front electrode and the white particles to the rear electrode, so that the medium will appear black to the observer. Conversely, if the front electrode is positive relative to the rear electrode, the white particles will be attracted to the front electrode and the black particles to the rear electrode, so that the medium will appear white to the observer.

If the two types of particles have charges of the same polarity, but differ in electrophoretic mobility (this type of medium may hereinafter to referred to as a "same polarity dual particle" medium), both types of particles will be attracted to the same electrode, but one type will reach the electrode before the other, so that the type facing the observer differs depending upon the electrode to which the particles are attracted. For example suppose the previous illustration is modified so that both the black and white particles are positively charged, but the black particles have the higher electrophoretic mobility. If now the front electrode is negative relative to the rear electrode, both the black and white particles will be attracted to the front electrode, but the black particles, because of their higher mobility will reach it first, so that a layer of black particles will coat the front electrode and the medium will appear black to the observer. Conversely, if the front electrode is positive relative to the rear electrode, both the black and white particles will be attracted to the rear electrode, but the black particles, because of their higher mobility will reach it first, so that a layer of black particles will coat the rear electrode, leaving a layer of white particles remote from the rear electrode and facing the observer, so that the medium will appear white to the observer: note that this type of dual particle medium requires that the suspending fluid be sufficiently transparent to allow the layer of white particles remote from the rear electrode to be readily visible to the observer. Typically, the suspending fluid in such a display is not colored at all, but some color may be incorporated for the purpose of correcting any undesirable tint in the white particles seen therethrough.

Both single and dual particle electrophoretic displays may be capable of intermediate gray states having optical characteristics intermediate the two extreme optical states already described.

Some of the aforementioned patents and published applications disclose encapsulated electrophoretic media having three or more different types of particles within each capsule. For purposes of the present application, such multiparticle media are regarded as sub-species of dual particle media.

Many of the aforementioned patents and applications recognize that the walls surrounding the discrete microcapsules in an encapsulated electrophoretic medium could be replaced by a continuous phase, thus producing a so-called polymer-dispersed electrophoretic display, in which the electrophoretic medium comprises a plurality of discrete droplets of an electrophoretic fluid and a continuous phase of a polymeric material, and that the discrete droplets of electrophoretic fluid within such a polymer-dispersed electrophoretic display may be regarded as capsules or microcapsules even though no discrete capsule membrane is associated with each individual droplet; see for example, the aforementioned 2002/0131147. Accordingly, for purposes of the present application, such polymer-dispersed electrophoretic media are regarded as sub-species of encapsulated electrophoretic media.

A related type of electrophoretic display is a so-called "microcell electrophoretic display". In a microcell electrophoretic display, the charged particles and the suspending fluid are not encapsulated within microcapsules but instead are retained within a plurality of cavities formed within a carrier medium, typically a polymeric film. See, for example, International Application Publication No. WO 02/01281, and published U.S. application Ser. No. 2002/0075556, both assigned to Sipix Imaging, Inc.

Although electrophoretic media are often opaque (since, for example, in many electrophoretic media, the particles substantially block transmission of visible light through the display) and operate in a reflective mode, many electrophoretic displays can be made to operate in a so-called "shutter mode" in which one display state is substantially opaque and one is light-transmissive. See, for example, the aforementioned U.S. Pat. Nos. 6,130,774 and 6,172,798, and U.S. Pat. Nos. 5,872,552; 6,144,361; 6,271,823; 6,225,971; and 6,184,856. Dielectrophoretic displays, which are similar to electrophoretic displays but rely upon variations in electric field strength, can operate in a similar mode; see U.S. Pat. No. 4,418,346. Other types of electro-optic displays may also be capable of operating in shutter mode.

An encapsulated or microcell electrophoretic display typically does not suffer from the clustering and settling failure mode of traditional electrophoretic devices and provides further advantages, such as the ability to print or coat the display on a wide variety of flexible and rigid substrates. (Use of the word "printing" is intended to include all forms of printing and coating, including, but without limitation: pre-metered coatings such as patch die coating, slot or extrusion coating, slide or cascade coating, curtain coating; roll coating such as knife over roll coating, forward and reverse roll coating; gravure coating; dip coating; spray coating; meniscus coating; spin coating; brush coating; air knife coating; silk screen printing processes; electrostatic printing processes; thermal printing processes; ink jet printing processes; electrophoretic deposition; and other similar techniques.) Thus, the resulting display can be flexible. Further, because the display medium can be printed (using a variety of methods), the display itself can be made inexpensively.

One potentially important market for electrophoretic media is windows with variable light transmission. As the energy performance of buildings and vehicles becomes increasingly important, electrophoretic media could be used as coatings on windows to enable the proportion of incident radiation transmitted through the windows to be electronically controlled by varying the optical state of the electrophoretic media. Effective implementation of such "variable-transmissivity" ("VT") technology in buildings is expected to provide (1) reduction of unwanted heating effects during hot weather, thus reducing the amount of energy needed for cooling, the size of air conditioning plants, and peak electricity demand; (2) increased use of natural daylight, thus reducing energy used for lighting and peak electricity demand; and (3) increased occupant comfort by increasing both thermal and visual comfort. Even greater benefits would be expected to accrue in an automobile, where the ratio of glazed surface to enclosed volume is significantly larger than in a typical building. Specifically, effective implementation of VT technology in automobiles is expected to provide not only the aforementioned benefits but also (1) increased motoring safety, (2) reduced glare, (3) enhanced mirror performance (by using an electro-optic coating on the mirror), and (4) increased ability to use heads-up displays. Other potential applications include of VT technology include privacy glass and glare-guards in electronic devices.

The present invention relates to adapting particle-based electrophoretic media, which may be encapsulated or unencapsulated, for use in light modulators.

SUMMARY OF THE INVENTION

IN one aspect, this invention provides an electrophoretic medium comprising a suspending fluid and a plurality of electrically charged particles disposed in the suspending fluid and capable of moving therethrough on application of an electric field to the suspending fluid, the suspending fluid and electrically charged particles being present as a plurality of discrete droplets, the electrophoretic medium further comprising a continuous phase surrounding the droplets, wherein the difference between the refractive index of the suspending fluid and the continuous phase is not greater than about 0.07.

This aspect of the invention may hereinafter for convenience be called the "index matched suspending fluid" medium of the invention. Desirably the difference between the refractive index of the suspending fluid and the continuous phase is not greater than about 0.05, preferably less than 0.03, and the smaller this difference can be made the better, the ideal being of course to have the two refractive indices exactly the same, although in practice this may be difficult to achieve given the other limitations on the materials to be used.

The index matched suspending fluid medium of the invention can be of several different types. The electrophoretic medium may be an encapsulated electrophoretic medium in which the continuous phase comprises a plurality of capsule walls surrounding the droplets. Alternatively, the electrophoretic medium may be a polymer-dispersed electrophoretic medium in which a polymeric binder is in direct contact with the suspending fluid. The electrophoretic medium may also be of the microcell type with a continuous phase comprising a carrier medium having a plurality of closed cavities from therein, with the droplets being confined within the cavities. As discussed in more detail below, in a preferred form of the index matched suspending fluid medium of the invention, the suspending fluid comprises a mixture of a hydrocarbon and chloronaphthalene.

This invention extends to an electrophoretic display comprising a layer of an index matched suspending fluid medium of the invention and electrode means arranged to apply an electric field to the electrophoretic medium, the electrode means being arranged to drive the electrophoretic medium to a non-light-transmissive state, in which the particles occupy a major proportion of the area of the layer, thereby rendering the layer substantially non-light-transmissive, and a transmissive state, in which the particles occupy only a minor proportion of the area of the layer, thereby rendering the layer substantially light-transmissive.

In another but related aspect, this invention provides an electrophoretic medium comprising a suspending fluid and a plurality of electrically charged particles disposed in the suspending fluid and capable of moving therethrough on application of an electric field to the suspending fluid, the suspending fluid and electrically charged particles being present as a plurality of discrete droplets, each droplet being surrounded by a capsule wall, the electrophoretic medium further comprising a polymeric binder phase surrounding the capsule walls, wherein the difference between the refractive index of the capsule walls and the polymeric binder is not greater than about 0.07. This aspect of the invention may hereinafter for convenience be called the "index matched binder" medium of the invention. As with the index matched suspending fluid aspect of the invention, in the index matched binder medium, desirably the difference between the refractive index of the capsule walls and the polymeric binder is not greater than about 0.05, preferably less than 0.03, and the smaller this difference can be made the better, the ideal being of course to have the two refractive indices exactly the same, although in practice this may be difficult to achieve given the other limitations on the materials to be used.

This invention extends to an electrophoretic display comprising a layer of an index matched binder electrophoretic medium of the invention and electrode means arranged to apply an electric field to the electrophoretic medium, the electrode means being arranged to drive the electrophoretic medium to a non-light-transmissive state, in which the particles occupy a major proportion of the area of the layer, thereby rendering the layer substantially non-light-transmissive, and a transmissive state, in which the particles occupy only a minor proportion of the area of the layer, thereby rendering the layer substantially light-transmissive.

In another aspect, this invention provides an improvement in a process for forming an electrophoretic medium, which process comprises:
 (a) providing a substrate;
 (b) applying to the substrate a coating material comprising a plurality of capsules in a liquid phase, each of the capsules comprising a suspending fluid and a plurality of electrically charged particles disposed in the suspending fluid and capable of moving therethrough on application of an electric field to the capsule, and subjecting the coating material to conditions effective to cause formation of a coherent solid layer containing the capsules on the substrate; and (c) applying an adhesive layer over the capsule-containing layer on the substrate. The improvement comprises planarizing the capsule-containing layer on the substrate after step (b) but before step (c).

This aspect of the invention may hereinafter for convenience be called the "planarized capsule layer" process of the invention. In this process, the planarization may be effected by coating the capsule-containing layer with a material having a refractive index which does not differ from that of the capsule layer by more than about 0.1. Alternatively, the planarization may be effected by mechanical pressure on the capsule-containing layer.

In another aspect, this invention provides an electrophoretic display comprising a layer of an electrophoretic medium comprising a suspending fluid and a plurality of electrically charged particles disposed in the suspending fluid and capable of moving therethrough on application of an electric field to the suspending fluid, and electrode means arranged to apply an electric field to the electrophoretic medium, the electrode means being arranged to drive the electrophoretic medium to a non-light-transmissive state, in which the particles occupy a major proportion of the area of the layer, thereby rendering the layer substantially non-light-transmissive, and a transmissive state, in which the particles occupy only a minor proportion of the area of the layer, thereby rendering the layer substantially light-transmissive, wherein the suspending fluid and electrically charged particles are present as a plurality of discrete droplets, the electrophoretic medium further comprising a continuous phase within which the droplets are confined, the droplets having an aspect ratio of at least about 2.

For convenience, this aspect of the invention may hereinafter be called the "flattened droplets" display of the invention. The electrophoretic medium used in such as display may be of various types, including the encapsulated electrophoretic medium, polymer-dispersed electrophoretic medium and microcell electrophoretic medium mentioned above.

In another aspect, this invention provides a method of driving an electrophoretic display, the display comprising a layer of an electrophoretic medium having first and second surfaces on opposed sides thereof, and electrode means arranged to apply an electric field to the electrophoretic medium, the electrode means being arranged to drive the electrophoretic medium to a non-light-transmissive state, in which the particles occupy a major proportion of the area of the layer, thereby rendering the layer substantially non-light-transmissive, and a transmissive state, in which the particles occupy only a minor proportion of the area of the layer, thereby rendering the layer substantially light-transmissive, wherein the electrophoretic medium comprises a suspending fluid and a plurality of electrically charged particles disposed in the suspending fluid and capable of moving therethrough on application of an electric field to the suspending fluid, the suspending fluid and electrically charged particles being present as a plurality of discrete droplets, the electrophoretic medium further comprising a continuous phase within which the droplets are confined, the method comprising:

while the display is in its non-light-transmissive state, applying via the electrode means a direct current electric field, thereby moving the particles adjacent one of the first and second surfaces of the electrophoretic medium; and thereafter applying via the electrode means an alternating current field, thereby moving the particles laterally within the electrophoretic medium and causing the display to assume its light-transmissive state.

For convenience, this aspect of the invention may hereinafter be called the "DC/AC dive method" of the invention. The electrophoretic medium used in such a method may be of various types, including the encapsulated electrophoretic medium, polymer-dispersed electrophoretic medium and microcell electrophoretic medium mentioned above.

In another aspect, this invention provides an electrophoretic display comprising a laminar carrier medium having end walls and side walls defining a plurality of closed cavities formed therein, the sidewalls extending substantially normal to the thickness of the laminar carrier medium, each of the cavities having confined therein a suspending fluid and a plurality of electrically charged particles disposed in the suspending fluid and capable of moving therethrough on application of an electric field to the suspending fluid, wherein at least a portion of each side wall is electrically conductive.

For convenience, this aspect of the invention may hereinafter be called the "conductive sidewall microcell display" of the invention. The display may further comprise a light-transmissive front electrode provided at or adjacent one major surface of the laminar medium and at least one rear electrode at or adjacent the other major surface of the laminar medium, and therein the conductive side walls are electrically connected to at least one of the rear electrodes but are insulated from the front electrode.

In another aspect, this invention provides a light modulator comprising two light-transmissive panels spaced from one another and an electrophoretic medium disposed between the two panels, the electrophoretic medium having a light-transmissive state and a dark state in which its light transmission is lower than in its light-transmissive date, wherein the electrophoretic medium is sensitive to at least one wavelength of electromagnetic radiation, and at least one of the light-transmissive panels comprises an absorber for electromagnetic radiation of this wavelength. For convenience, this aspect of the invention may hereinafter be called the "radiation-absorbing panel light modulator" of the invention.

Finally, this invention provides an electrophoretic display comprising a layer of an electrophoretic medium comprising a suspending fluid and a plurality of first particles, which are electrically charged and colored, and disposed in the suspending fluid and capable of moving therethrough on application of an electric field to the suspending fluid, and electrode means arranged to apply an electric field to the electrophoretic medium, the electrode means being arranged to drive the electrophoretic medium to a non-light-transmissive state, in which the first particles occupy a major proportion of the area of the layer, thereby rendering the layer substantially non-light-transmissive, and a transmissive state, in which the first particles occupy only a minor proportion of the area of the layer, thereby rendering the layer substantially light-transmissive, wherein the electrophoretic medium also comprises a plurality of second particles, which are electrically charged and substantially transparent, disposed in the suspending fluid and capable of moving therethrough on application of an electric field to the suspending fluid.

For convenience, this aspect of the invention may hereinafter be called the "transparent particle electrophoretic display" of the invention. The electrophoretic medium used in such a display may be of various types, including the encapsulated electrophoretic medium, polymer-dispersed electrophoretic medium and microcell electrophoretic medium mentioned above.

BRIEF DESCRIPTION OF THE DRAWING

The sole FIGURE of the accompanying drawing is a graph showing the variation in optical density with applied field frequency for an electrophoretic medium of the present invention.

DETAILED DESCRIPTION

As already indicated, this invention provides a variety of improvements in electrophoretic media and displays intended for use in light modulators. These various aspects will mainly be discussed separately (or in related groups) below, but it should be understood that a single electrophoretic medium or display may make use of more than one aspect of the invention; for example, an electrophoretic display might make use of both the DC/AC drive method and the transparent particles aspects of the invention.

Refractive Index Matching Aspects of the Invention

Hitherto, the electro-optic properties of most electrophoretic media have been optimized to ensure good optical density when the media are being used in an opaque or substantially opaque state, and relatively little consideration has been given to improving light transmission in the "transparent" state when such media are used in a shutter or variable transmission mode. However, a number of techniques are available for improving such light transmission.

Firstly, in an electrophoretic medium, one major source of light scattering, and hence lack of transparency in a transmissive state, is the boundary between the droplets of the internal phase (the suspending fluid and the electrophoretic particles therein) and the continuous phase which surrounds the droplets. To reduce light scattering at this boundary, it is desirable to match the refractive indices of the suspending fluid and the continuous phase material as closely as possible, within (say) 0.07, desirably within 0.05, and preferably within 0.03. Typically, in prior art media, the continuous phase material has a substantially higher refractive index than the aliphatic hydrocarbon solvents used as the suspending fluid, and to increase the refractive index of the latter, aromatic and polyhalide solvents (and possibly also silicones) may be used in the suspending fluid to increase its refractive index. For example, the suspending fluid might comprise a mixture of Isopar (Registered Trade Mark), refractive index, n=1.42, with any one or more of biphenyl (n=1.59), phenyl naphthalene (n=1.67), bromobenzene (n=1.56), bromonaphthalene (n=1.64), methoxynaphthalene (n=1.69), polybromoaromatics, or polybromoalkanes.

It will readily be apparent to those skilled in optics that since light scattering occurs at the boundary between any two phases having differing refractive indices, the light scattering which the present invention seeks to reduce will occur whatever the exact nature of the continuous phase surrounding the suspending fluid, and thus that this aspect of the present invention is applicable to all types of particle-based electrophoretic media and displays. For example, the electrophoretic medium may be an encapsulated electrophoretic medium, in which case the relevant boundary is that between the suspending fluid and the plurality of capsule walls surrounding the droplets. Alternatively, the electrophoretic medium may be a polymer-dispersed electrophoretic medium, in which case the relevant boundary is that between the suspending fluid and the polymeric binder which is in direct contact with the suspending fluid. The medium may also be of the microcell type, in which case the relevant boundary is that between the suspending fluid and the walls defining the microcells.

Specifically, the gelatin-based capsule walls used in encapsulated electrophoretic media described in many of the E Ink and MIT patents and applications mentioned above have a refractive index of about 1.53, and the refractive index of Isopar may be increased to match this refractive index by admixing it with chloronaphthalene (n=1.63), the optimum proportion of chloronaphthalene being about 55 per cent by volume.

Similarly, in encapsulated electrophoretic media, such as those described in many of the aforementioned E Ink and MIT patents and applications, in which a plurality of capsules are embedded in a polymeric binder, the "continuous phase" of the electrophoretic medium itself comprises two separate phases, namely the capsule walls and the binder, and a major source of light scattering and lack of transparency is the boundary between the capsule wall and the binder, and it is desirable to index match the capsule wall and the binder as closely as possible, again within (say) about 0.07, desirably about 0.05, and preferably about 0.03.

As already noted, the gelatin-based capsule walls described in many of the E Ink and MIT patents and applications mentioned above have a refractive index of about 1.53, and the polyurethane-based binders with which such capsule walls have hitherto typically been used are not well index matched to the gelatin-based capsule walls. Ideally of course, one could use the same material for the capsule walls and the binder, but there are practical difficulties in coating electrophoretic media having gelatin binders. Binders which are well index matched to gelatin-based capsule walls and which may be easier to coat include gelatin, poly(vinylpyrrolidone) (n=1.53), cellulose (n=1.54) and poly(methylacrylamide) (n=1.514).

Another location where light scattering occurs in a typical electrophoretic display is the interface between the electrophoretic medium layer itself and the lamination adhesive which is normally used to secure this layer to another layer of the final display, for example a backplane or other electrode assembly. In the case of encapsulated electrophoretic media, light scattering at this interface is exacerbated by the fact that the interface is typically not planar; the capsules within the capsule/binder layer cause "bumps" on the surface of the layer, resulting in a non-planar interface, and it is well known to those skilled in optics that a non-planar index mismatched interface results in more light scattering than a similar planar interface. (The same interface in a polymer-dispersed electrophoretic medium may also be non-planar for similar reasons, although the extent of non-planarity is likely to be less than in the case of an encapsulated electrophoretic medium.) The light scattering at this interface may be substantially reduced by accurate index matching of the binder, capsule wall and lamination adhesive, but given the large number of mechanical and electrical constraints placed upon lamination adhesives for use with electrophoretic media (see especially U.S. Patent Publication 2003/0025855), it may be difficult to find a lamination adhesive which achieves accurate index matching and still satisfies all the other constraints. Accordingly, since some degree of index mismatching may have to be tolerated at the interface between the electrophoretic layer and the lamination adhesive, it is advantageous to make this interface as planar as possible by planarizing the capsule/binder layer before this layer is contacted with the lamination adhesive. Such planarization may be effected by coating the exposed surface of the capsule/binder layer with a solution of an index-matching material, preferably gelatin, and drying prior to contacting the capsule/binder layer with the lamination adhesive. Alternatively, planarization may be effected mechanically by calendaring, i.e. by subjecting the capsule/binder layer to pressure, and optionally heat, typically by contacting it with a roller. If mechanical planarization is used, care should of course be taken to choose planarization conditions which will not cause excessive capsule bursting.

Droplet Aspect Ratio and Material Considerations

It may be desirable to use relatively large droplets (often in the form of large capsules or microcells) in light modulators, at least when it is not possible to achieve accurate index matching of the various components of the electrophoretic medium. When electrophoretic media are used in a non-transmissive mode, small droplets and thin, preferably monolayer, media are generally preferred since for a given operating voltage and internal phase, smaller droplets result in greater switching speeds, which are desirable when images are being changed, and many of the aforementioned E Ink and MIT patents and applications show use of small droplets in the form of capsules having diameters in the range of about 20-50 µm. However, in most light modulators, such as variable transmission windows, switching speed is usually not of great importance, and since the capsule walls or other continuous phases are a major source of light scattering, it is desirable to reduce the amount of capsule wall or continuous phase per unit area of the modulator. The perimeter of capsule wall or microcell wall in the aerial cross-section of the electrophoretic layer is roughly inversely proportional to the diameter of the capsules or microcell size (and a similar effect is found for polymer-dispersed electrophoretic media). Since the capsule or microcell wall, or the boundary between the droplet and the continuous phase in the case of a polymer-dispersed electrophoretic medium) is expected to be the principal source of scattering, increasing the capsule diameter to about 100-150 µm) should reduce scattering by a factor of about 3. It should be noted that the electrophoretic layer thickness will typically be substantially less than the capsules diameter (say around 40-50 µm) so that the large capsules will be flattened into a "pancake" shape, with the droplet within the capsule having an aspect ratio (height/width) not greater than about 0.5, and desirably not greater than about 0.35. Such a pancake shape may be best achieved by using highly flexible or conformal capsules having a lower degree of cross-linking that typically used in the aforementioned E Ink and MIT patents and applications; however, it should be noted that gelatin capsules which are not cross-linked are highly susceptible to bursting. Similarly, one can use polymer-dispersed electrophoretic media with droplets having similar aspect ratios, and microcells having similar aspect ratios.

The electrophoretic particle size and volume fraction should be optimized to achieve maximal clarity in the transparent ("open") state and adequate opacity in the opaque ("closed") state. It is desirable to keep the volume fraction of electrophoretic particles at or near the minimum which will achieve adequate opacity in the non-light transmissive ("closed") state, since any increase in the volume fraction above the minimum has no significant effect on the closed state but does produce larger aggregates of particles in the light-transmissive ("open") state, hence reducing the light transmission in this state. Use of a light colored pigment (for example aluminum or another metallic pigment) should improve the light transmitting characteristics of the open state, and at the same time provide a more attractive, light-colored reflective appearance, rather than a black appearance, in the closed state.

When a light modulator of the present invention is to used in window or similar glass to control heat transmission, electrophoretic particles with high infra-red reflectivity are desirable; example of IR-reflective pigments include titania and zinc sulfide.

The light modulators of the present invention should typically have high bistability, up to several hours or more. Their bistability can be increased by addition of rheological addenda of any kind, including polyisobutylene (PIB) or Kraton, as described in U.S. patent Publication 2002/0180687. Since switching speed is not of the highest importance in many light modulators, excellent image stability might be achieved by the depletion-flocculation mechanism, as described in this published application.

Typically, the light modulators of the present invention will operate in a dielectrophoretic mode, as described in the aforementioned 2004/0136048. Although as already mentioned switching speed is not of the highest importance in many light modulators, dielectrophoretic movement of particles is usually much slower than movement of the same particles electrophoretically along the lines of an electric field, and it may be advisable to effect certain modifications of the electrophoretic medium to prevent dielectrophoretic switching times becoming excessively long. For example, it may be useful to replace the carbon black often used as an electrophoretic particle with a larger, more conductive pigment. While carbon particles may represent the optimal choice, by reason of their low cost, metallic, or semiconductive particles may have advantages. The dielectrophoretic effect depends on the conductivity, since it is the result of an induced dipolar interaction with the field. Higher conductivity should result in particles that respond more readily. Semiconductive particles, particularly those with such high doping levels that they have relatively high conductivities, may also be used; the polarizability of the particle is important for the dielectrophoretic performance, so elements low in the periodic table may be better (e.g. cadmium sulfide, selenide or telluride). Also, with semiconductive particles, it may be possible to tune the response by changing the doping level, so that at one frequency the switching will be mostly electrophoretic, whereas at another, dielectrophoresis will occur preferentially. While this behavior should also be displayed by simple conductive particles (like carbon or metals) the frequency at which maximal response occurs might be expected to be affected by the internal electrical resistance of the particle. This effect, i.e., the dependence of the response on frequency, may afford a method of causing the display to close (see below regarding the scrubbing bubble effect).

Smaller electrophoretic particles are likely to give a faster response to a polarizing field.

In accordance with the transparent particles aspect of the present invention, it may also be advantageous to incorporate into the electrophoretic medium of a light modulator, in addition to the primary colored electrophoretic particles, secondary, substantially transparent electrophoretic particles. These second electrophoretic particles ("scrubbing bubbles") may bear a charge of either polarity (i.e., the same as or opposite to the charges on the primary electrophoretic particles) and may be moved by a low frequency waveform to stir up the electrophoretic medium. Such transparent particles could be, for example very small (20-50 μm) particles of silica, or another colloid, that are too small to scatter light appreciably. Alternatively, the transparent particles could be index-matched (to the suspending fluid) polymer particles, either a non-swelling latex particle with the correct refractive index or a swellable, but insoluble, particle, possibly comprising a cross-linked microgel; such a microgel latex might be particularly beneficial because in its swollen form it would comprise a majority of solvent, and therefore be easier to index-match with the medium, resulting in low scattering.

Driving Methods and Methods for Restricting Particle Movement

In the light modulators of the present invention, the transparent state is brought about by field dependent aggregation of the electrophoretic particles; such field dependent aggregation may take the form of dielectrophoretic movement of electrophoretic particles to the lateral walls of a droplet (whether that droplet is present in a polymer-dispersed medium, or within a capsule or microcell), or "chaining", i.e., formation of strands of electrophoretic particles within the droplet, or possibly in other ways. Regardless of the exact type of aggregation achieved, such field dependent aggregation of the electrophoretic particles causes the particles to occupy only a small proportion of the viewable area of each droplet, as seen in a direction looking perpendicular to the viewing surface through which an observer views the electrophoretic medium. Thus, in the light-transmissive or open state, the major part of the viewable area of each droplet is free from electrophoretic particles and light can pass freely therethrough. In contrast, in the non-light-transmissive or closed state, the electrophoretic particles are distributed throughout the whole viewable area of each droplet (the particles may be uniformly distributed throughout the volume of the suspending fluid or concentrated in a layer adjacent one major surface of the electrophoretic layer), so that no light can pass therethrough.

It can be shown by conventional theory that field dependent aggregation of the electrophoretic particles, and hence the formation of an open state, is promoted by application of high frequency fields (typically at least 10 Hz) to the electrophoretic medium, and by the use of irregularly shaped droplets, highly conductive electrophoretic particles, and a low conductivity, low dielectric constant suspending fluid. Conversely, dispersion of the electrophoretic particles into the suspending fluid or their concentration adjacent one major surface of the electrophoretic layer, and hence the formation of a closed state, is promoted by application of low frequency fields (typically less than 10 Hz) to the electrophoretic medium, and by the use of highly charged electrophoretic particles, higher conductivity, higher dielectric constant suspending fluid, and charged droplet walls.

In other words, to decrease closing time in a dielectrophoretic display (i.e., recovery from dielectrophoretic migration) or a stranding display (i.e., one in which the particles aggregate as in an electrorheological fluid), it is advantageous to vary both the operating voltage and the waveform, using a high frequency, high voltage waveform for opening the modulator and a low frequency, low voltage waveform for closing it. These changes in waveform can be coupled with either patterned electrodes or with the semiconductive particles described above to optimize the response in both directions.

The sole FIGURE of the accompanying drawings is a graph showing the variation in optical density with applied field frequency for an experimental electrophoretic medium of the present invention which contained carbon black encapsulated with Isopar/chloronaphthalene suspending fluid in 100-150 μm capsules using for the capsule walls the gelatin/acacia coacervate cross-linked with glutaraldehyde, and the polyurethane binder, as described in the aforementioned E Ink and MIT patents and applications. The capsule/binder layer was not planarized and a conventional polyurethane lamination adhesive, not index matched to the capsule/binder layer, was used. The FIGURE shows the variation of optical density of the medium with the frequency of the applied field, and it will be seen that the optical density could be adjusted from about 0.9 to about 0.3 (corresponding to optical transmissivities of about 10 and 50 per cent respectively) simply by adjusting the frequency of the applied field. The medium displayed slight hysteresis, so the results for opening (black to transparent) and closing (transparent to black) transitions of the medium are plotted separately in the FIGURE. In contrast to the results typically obtained with DC driving of electrophoretic media (see for example, the aforementioned 2003/0137521), it was found that the optical density of the medium was not history-dependent (i.e., the optical density obtained was not a function of the prior states of the medium). This greatly simplified driving the medium.

As previously noted, the optical density of an electrophoretic medium of the present invention, at least as seen perpendicular to the thickness of the electrophoretic layer, is a function of the fraction of the viewable area occupied by the electrophoretic particles, and to produce the best transparent state, this fraction should be as small as possible. However, as will readily be apparent to those skilled in imaging science, the appearance of the transparent state of the medium when viewed off-axis (i.e., when viewed in a direction at an acute angle to the thickness of the electrophoretic layer) is a function not only of the fraction of the viewable area occupied by the electrophoretic particles, but also of the distribution of the electrophoretic particles through the thickness of the electrophoretic layer. If the particles form structures extending through the whole thickness of the electrophoretic layer (for example, if the particles occupy the entire sidewalls of droplets, or form strands extending throughout the thickness of the layer), these structures will be visible when the medium is viewed off-axis, and may occupy a substantial proportion of the visible area, thus reducing the off-axis transparency of the medium. If, however, the particles form structures extending through only part of the thickness of the electrophoretic layer, when the medium is viewed off-axis these structures will occupy a smaller proportion of the visible area, thus improving the off-axis transparency of the medium.

To improve off-axis transparency, it may be advantageous to keep the electrophoretic layer as thin as possible, thus reducing the size of any particle structures extending through the thickness of the electrophoretic layer; however, as noted above, a thin electrophoretic layer requires a corresponding increase in the volume fraction of electrophoretic particles to achieve adequate opacity in the closed state of the display. Accordingly, there is likely to be an optimum thickness of the electrophoretic layer for any given selection of materials for use in a light modulator. Also, if the structures are of a type which occupy the sidewalls of a droplet, it is advantageous to use wide droplets, since this reduces the number of sidewalls on which the particle structures form, and hence the proportion of the visible area occupied by the structures when the electrophoretic layer is viewed off-axis. In other words, the transparency of such an electrophoretic layer viewed off-axis is a function of the aspect ratio (height to maximum lateral dimension) of the droplets.

Off-axis transparency can also be improved by controlling the particle structures so that they do not occupy the whole sidewalls of a droplet. In particular, it is advantageous to concentrate the particles so that the particle structures occupy only part of the sidewalls adjacent one major surface of the layer of electrophoretic medium. Such particle structures may be produced in accordance with the DC/AC drive method of the present invention by first bringing all the particles within a droplet adjacent one major surface of the electrophoretic layer by applying a DC field to the layer, and then driving the particles to the sidewalls using an AC field of appropriate frequency.

In the case of microcell electrophoretic media, in accordance with the conductive sidewall microcell aspect of the present invention, it may be advantageous to make at least a portion of each sidewall electrically conductive. Such conductive sidewalls may or may not be insulated from the electrodes used to drive the electrophoretic medium. If the conductive sidewalls are insulated from the drive electrodes, as the medium is driven, such conductive sidewalls will become polarized by induction, and the electric field experienced by the electrophoretic internal phase within the microcells will be concentrated in the areas between the conductive sidewalls and the driving electrodes, so that any particle structures formed will be concentrated adjacent these areas and will not spread over the whole of the sidewalls. Alternatively, the conductive sidewalls may be in electrical contact with the backplane of the display, but isolated from the front electrode(s), thereby concentrating electric field strength near the "tops" of the sidewalls (i.e., in the portions of the sidewalls adjacent the front electrode(s)), so that, in the open state of the display, the electrophoretic particles would become concentrated adjacent these portions of the sidewalls.

The electro-optic performance of the light modulators of the present invention may also be substantially affected by the geometry of the electrodes used to drive the display. To switch the modulator between its open and closed states, it is necessary to move the electrophoretic particles laterally (i.e., in the plane of the electrophoretic medium) and such lateral switching may be achieved using a number of different electrode geometries. Patterned electrodes, even if they have a spacing greater than the droplet size, can provide lateral motion of the electrophoretic particles, up to the sides of the droplets. When used in this way, the electrode width should be small relative to the gap between the electrodes, and the electrophoretic layer should be as thin as possible, in order to maximize the lateral component of the field. A top plane with a different polarity to the patterned backplane also helps to maximize the lateral field gradient, and concentrate the particles in regions of highest field.

Dielectrophoresis depends not on the field itself, but on the field gradient, so that patterned electrodes may also be advantageous for displays using this technique. Strong local field gradients may be produced by, for example, an interdigitated electrode (i.e., an electrode arrangement having two sets of alternating elongate tines, with the tines of each set being held at the same voltage) with the tines at different voltages, perhaps in conjunction with a top plane electrode. If the tines are then placed at the same potential, the device could be used to effect electrophoretic, front-back switching, which should enhance the rate of closing of an (open) transparent display.

Segmented, patterned electrodes on glass allow for signage based on a clear/opaque contrast (rather than a color-based, reflective contrast as in most prior art electrophoretic displays) in addition to general clear/opaque transition. The patterned electrodes would be placed so as to spell out letters or an image, and could be arranged to be addressed separately from the background.

CONCLUSION

The electrophoretic media used in the modulators of the present invention can be produced economically. Since uniform droplet size is not required, polymer-dispersed and/or unclassified (i.e., not selected for size) encapsulated media, possibly prepared by a limited coalescence procedure (see copending application Ser. No. 10/905,746 filed Jan. 19, 2005 (Publication No. 2005/0156340) could reduce costs resulting from loss of material during typical prior art encapsulation procedures. The relaxed requirement for droplet size in the present invention is due to the slow switching time feasible in a light modulator, and by the use of non-shear-degrading rheological addenda, such as aggregating block copolymers, as discussed above.

The cost of the electrophoretic media may be further reduced by using electrophoretic particles without covalently-attached polymer shells (of the type described in the aforementioned U.S. Pat. No. 6,822,782), so that the internal phase may contain, in addition to the electrophoretic particles and suspending fluid, only a surfactant/dispersing aid/charging agent. It may be possible to use bare carbon dispersions directly from the manufacturer, without synthetic preparation of any kind.

It should be noted that, since the desired contrast in the present light modulators is between a closed state in which light is blocked by the electrophoretic particles, and an open state in which the light is not blocked, the electrophoretic medium used will typically be single particle, since there is no need for more than one type of electrophoretic particle to be present. Furthermore, the suspending fluid in such a single particle medium will normally be undyed to provide maximum transparency in the open state.

Since switching (opening/closing) time is relatively unimportant in the present light modulators, the electrophoretic medium may be in the form of a multi-layer (as opposed to a monolayer) coating; and still give satisfactory results. If the system is adequately index-matched as a result of the appropriate choice of both internal phase materials and binder, and is otherwise optimized as described above, the trade-off between decreased cost and decreased transparency/increased haze (scattering) in a multi-layer coating may be favorable.

The preferred multi-level/multi-frequency waveforms for use in the present light modulators have already been discussed above. Control of the pulse shape of the waveform may also be desirable; for example, as between square and sine wave pulse shapes, the sine wave may give better closing behavior because polarization of particles builds more slowly and under conditions where less hydrodynamic mixing of the system occurs.

As noted in some of the aforementioned E Ink and MIT patents and applications, electrophoretic media are often sensitive to various wavelengths of electromagnetic radiation, which tend, inter alia, to decrease the working lifetime of the media. Hence it is often desirable to provide filter layers to screen the media from radiation to which they are sensitive. A variable transmission window of the present invention will typically have the form of an electrophoretic medium sandwiched between two panes of glass, and, in accordance with the radiation-absorbing panel aspect of the present invention, in this structure cost savings can be achieved by providing the necessary filtering, for example ultra-violet and/or infra-red filtering, in one or both of the glass panes (or other similar panels used), rather than providing separate filter layers in the electrophoretic medium.

It will be apparent to those skilled in the art that numerous changes and modifications can be made in the specific embodiments of the present invention described above without departing from the scope of the invention. Accordingly, the whole of the foregoing description is to be construed in an illustrative and not in a limitative sense.

What is claimed is:

1. In a process for forming an electrophoretic medium, which process comprises:

(a) providing a substrate;

(b) applying to the substrate a coating material comprising a plurality of capsules in a liquid phase, each of the capsules comprising a suspending fluid and a plurality of electrically charged particles disposed in the suspending fluid and capable of moving therethrough on application of an electric field to the capsule, and subjecting the coating material to conditions effective to cause formation of a coherent solid layer containing the capsules on the substrate; and (c) applying an adhesive layer over the capsule-containing layer on the substrate, the improvement which comprises planarizing the capsule-containing layer on the substrate after step (b) but before step (c).

2. A process according to claim 1 wherein the planarization is effected by coating the capsule-containing layer with a material having a refractive index which does not differ from that of the capsule layer by more than about 0.1.

3. A process according to claim 1 wherein the planarization is effected by applying mechanical pressure on the capsule-containing layer.

4. A method of driving an electrophoretic display, the display comprising a layer of an electrophoretic medium having first and second surfaces on opposed sides thereof, and electrode means arranged to apply an electric field to the electrophoretic medium, the electrophoretic medium comprising a suspending fluid and a plurality of electrically charged particles disposed in the suspending fluid and capable of moving therethrough on application of an electric field to the suspending fluid, the suspending fluid and electrically charged particles being present as a plurality of discrete droplets, the electrophoretic medium further comprising a continuous phase within which the droplets are confined, the electrode means being arranged to drive the electrophoretic medium to a non-light-transmissive state, in which the particles occupy a major proportion of the area of the layer, thereby rendering the layer substantially non-light-transmissive, and a transmissive state, in which the particles occupy only a minor proportion of the area of the layer, thereby rendering the layer substantially light-transmissive, the method comprising:

while the display is in its non-light-transmissive state, applying via the electrode means a direct current electric field, thereby moving the particles adjacent one of the first and second surfaces of the electrophoretic medium; and thereafter applying via the electrode means an alternating current field, thereby moving the particles laterally within the electrophoretic medium and causing the display to assume its light-transmissive state.

5. A method according to claim 4 wherein the electrically charged particles and the suspending fluid are confined within a plurality of capsules or microcells.

6. A method according to claim 4 wherein the suspending fluid is gaseous.

7. An electrophoretic display comprising a laminar carrier medium having end walls and side walls defining a plurality of closed cavities formed therein, the sidewalls extending substantially normal to the thickness of the laminar carrier medium, each of the cavities having confined therein a suspending fluid and a plurality of electrically charged particles disposed in the suspending fluid and capable of moving therethrough on application of an electric field to the suspending fluid, wherein at least a portion of each side wall is electrically conductive, the display further comprising a light-transmissive front electrode provided at or adjacent one major surface of the laminar medium and at least one rear electrode at or adjacent the other major surface of the laminar medium, and therein the conductive side walls are electrically connected to at least one of the rear electrodes but are insulated from the front electrode.

* * * * *